Aug. 1, 1950  G. J. KYAME  2,516,884
METHOD OF AND APPARATUS FOR PREPARATION AND
DISTRIBUTION OF SIZING MATERIALS
Filed Dec. 8, 1948  2 Sheets-Sheet 1
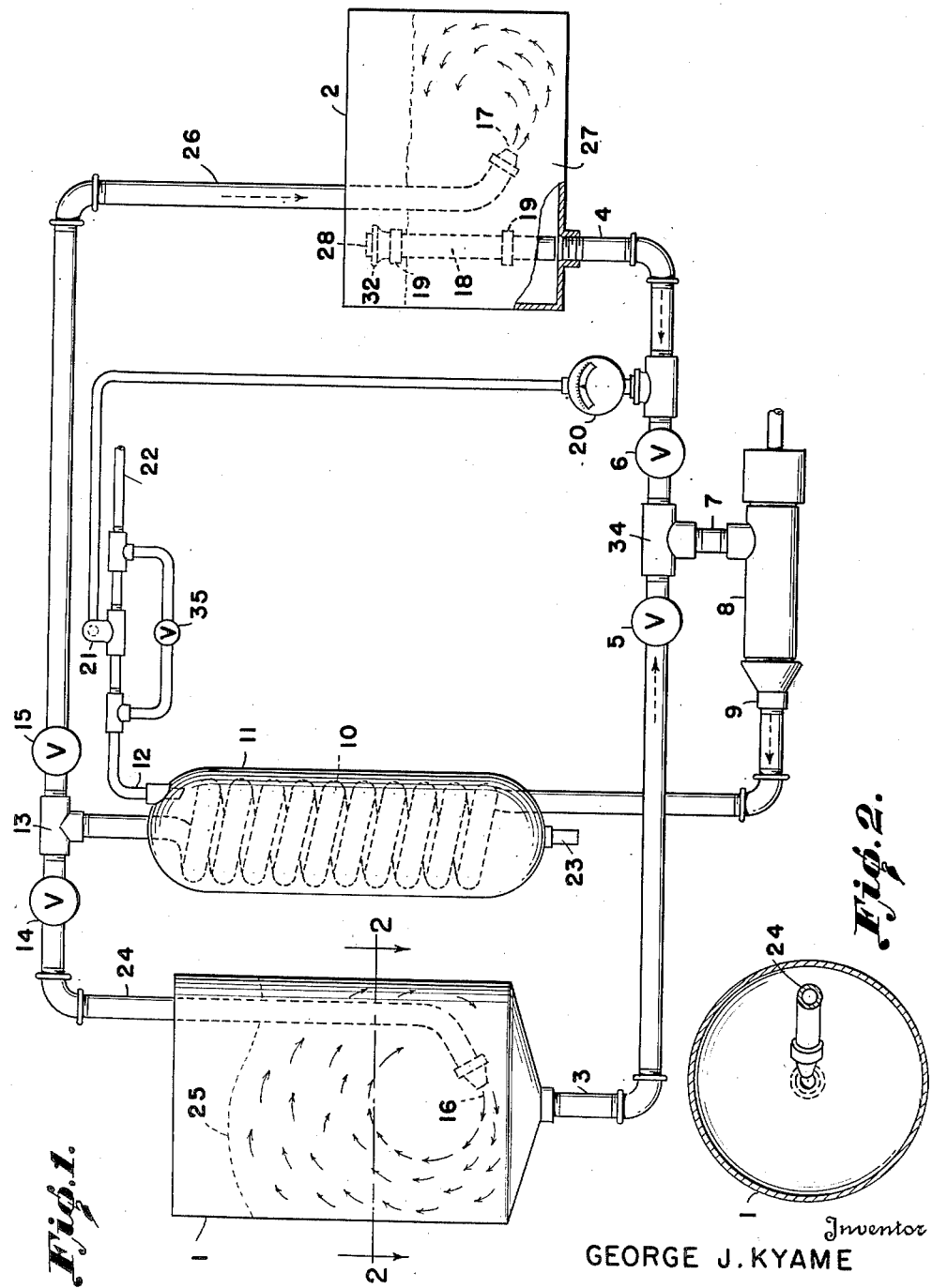
Inventor
GEORGE J. KYAME
By  L. M. Mantell
ATTORNEYS Aug. 1, 1950 G. J. KYAME 2,516,884
METHOD OF AND APPARATUS FOR PREPARATION AND
DISTRIBUTION OF SIZING MATERIALS
Filed Dec. 8, 1948 2 Sheets-Sheet 2

Inventor
GEORGE J. KYAME

By
J. M. Mansell
ATTORNEYS

Patented Aug. 1, 1950

2,516,884

UNITED STATES PATENT OFFICE 2,516,884

METHOD OF AND APPARATUS FOR PREPARATION AND DISTRIBUTION OF SIZING MATERIALS

George J. Kyame, New Orleans, La., assignor to the United States of America as represented by the Secretary of Agriculture Application December 8, 1948, Serial No. 64,068

3 Claims. (Cl. 127—28)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to a method of and an apparatus for the preparation of sizing materials and the like and the subsequent distribution of said materials to the place of use.

Heretofore, in the preparation of sizing compounds the dry ingredients are added to a tank partially filled with cold water under constant stirring. Stirring is usually accomplished by the use of slow-moving paddle-type agitators or of high-speed propeller-type mixers. When the dry ingredients are thoroughly dispersed the temperature is raised by injecting live steam directly into the mixture, or by heat conduction through the tank walls from a surrounding steam jacket. After cooking is complete the size is transferred by gravity feed or pump into storage tanks, from which it is distributed, again by gravity or pump, to a number of size boxes, in which the size is applied. In order to insure a sufficiency of size in the size box, a constant level is often maintained by feeding in an excess, allowing said excess to flow over a weir and finally pumping the spillage back to the storage tank. Other methods for maintaining a constant level consist in mechanically or electrically controlling the input of size to the box.

There are a number of disadvantages inherent in the methods and apparatus used heretofore. Among these are: inefficient dispersion of the dry ingredients during size preparation when using slow-speed paddle-type agitators; breakdown of the sizing compound as a result of the severe beating action of high-speed propeller-type mixers; the formation of lumps in the size cook when live steam is used in the makeup tank, or relatively inefficient heating when steam-jacketed kettles or steam coils are used. The size in the size box is usually kept hot by the addition of live steam. This leads to another defect, namely, uncontrolled dilution of the size. The prevalent methods for maintaining a constant level in the size box result in stagnation of the size, particularly in those instances where size is added only to replace that taken up by the material being impregnated. Stagnation takes place in these boxes which are not provided with adequate circulation. Stagnation often results in changes in the temperature and viscosity of the sizing compound. Such changes are usually detrimental to the impregnating operation.

In general, prior methods and apparatus are inefficient to the extent that satisfactory means are not provided for either circulating or heating. This invention corrects these deficiences by the use of a fluid jet to agitate the contents of a tank, and a novel type of float valve for maintaining a constant fluid level in a tank, and heating by circulating the fluid through a coiled pipe enclosed within a steam-filled container. My new size preparation unit comprises a makeup tank, pump, and heat exchanger so connected that the pump draws fluid from the bottom of the tank and forces it through the heat exchanger. The discharge from the heat exchanger is fed back into the tank at a position and in a direction designed to produce vigorous agitation of the contents. For storing and distributing the finished size the combination of storage tank, pump, heat exchanger and size box is used. In this instance, however, size is withdrawn simultaneously from storage tank and size box and pumped through the heat exchanger. The heat exchanger discharge is now divided into two streams, one going back to the storage tank and the other to the size box. Both streams are made to agitate the contents of the respective tanks. To make this method more easily applicable a novel float type valve which controls the rate of fluid withdrawal is used to maintain a constant fluid level in the size box.

A more detailed description of the invention follows and reference is made to the drawings wherein:

Figure 1 is a schematic diagram of the preferred embodiment of this invention.

Figure 2 is a sectional view on line 2—2 of Figure 1.

Figure 3:
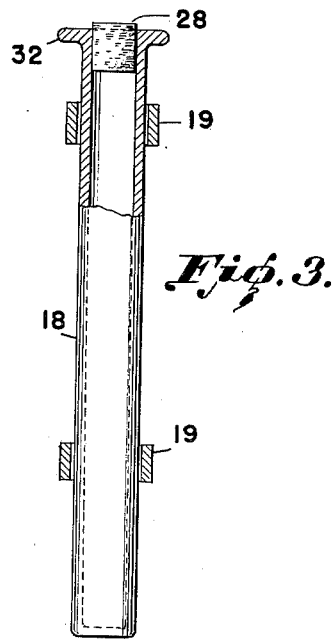
Figures 3 and 4 show two types of constant-length variable-weight level control float valves.

The preparation of sizing materials is usually carried out in apparatus separate from that used for storing and distributing. In some instances, particularly those in which the quantity of sizing material required at any one time does not exceed one tankful, the makeup or preparation tank is subsequently used for storage. When such is the case, the arrangement diagrammed in Figure 1 becomes applicable. When a separate preparation unit is needed to meet requirements, the arrangement in Figure 1 is used primarily for storage and distribution. The separate unit for preparation would then consist of makeup tank 1, valves 5 and 14, pump 8, and heat exchanger 11 connected substantially as shown in Figure 1, but with T's 13 and 34 replaced by elbows. Thus, Figure 1 illustrates the preparation of sizing material, or storage and distribution, or the combination of all three operations of sizing preparation, storage and distribution.

In Figure 1 is shown a tank 1, drain pipe 3, pump 8 having an inlet 7 and an outlet 9, heat exchanger 11 having enclosed a pipe coil 10, a steam inlet 12 and drain 23, a size box 2 having a drain 4, a float valve 18 with restricting guides 19, and valves 5, 6, 14, and 15 steam inlet line 22, controlled steam valve 21, and steam bypass valve 35.

Drains 3 and 4, respectively, connect tank 1 and size box 2 through corresponding valves 5 and 6 to inlet 7 of pump 8. Pump outlet 9 feeds the inlet end of heat exchanger coil 10. The outlet end of coil 10 discharges into T 13 which leads to tank 1 and size box 2 through valves 14 and 15, respectively.

Tank 1 is preferably cylindrical with a round or conical bottom but may be prism shaped, or conical, spherical, or flat-bottomed. The same is true of size box 2, the only requirement here being that space be provided directly above the drain for free vertical movement of level control valve 18 if this means of level control is used. It is preferred that pump 8 be one having high capacity at low operating speed in order to minimize breakdown of the sizes, such as starch sizes.

In the operation of preparing the sizing compound valves 6, 15, 21, and 35, are first closed and valves 5 and 14 opened. Tank 1 is partially filled with water, and pump 8 then started. The pump draws water from tank 1 through drain 3, valve 5, and T 34 into its inlet 7. Water leaving pump outlet 9 enters heat exchanger coil 10. The discharge from coil 10 enters T 13, passes through valve 14 and input pipe 24 emerging as jet 16. By properly positioning and directing jet 16 the contents 25 of tank 1 are vigorously agitated. Satisfactory results have been obtained as follows: The tank is 22" in diameter, 32" in overall height, and has a conical bottom having a 150° apex angle. The jet is 6" from the bottom and 5" from side of the tank. The direction of the jet is 115° from the vertical wall, pointing downward in a vertical plane along a diameter. The ,ameter of the jet is ½" at the nozzle. The pump capacity is 25 gallons per minute. The contents of tank is 35 gallons. The optimum position for the jet, however, is to a great extent dependent on the size and general configuration of the tank and the kinetic energy in the jet stream. Consequently, such position should be determined by experiment for any given installation. Under proper conditions said agitation is one of vigorous top-to-bottom turnover of the fluid contents 25 and not merely a whirlpool-like spinning action as obtained with some other types of mixers.

With the water 25 under constant agitation the dry ingredients, such as starch, or chemically treated starch, are added to tank 1. These follow the water flow through the pump where rapid dispersal is achieved. When dispersion is complete valve 35 is opened to allow steam to enter the jacket of heat exchanger 11. The mixture passing through the coils 10 begins to heat up; heating is allowed to continue until the sizing compound is thoroughly cooked when valve 35 is closed. Valve 15 is now opened to allow part of the size reaching T 13 to feed size box 2 through corresponding input pipe 26 and jet 17, simultaneously with return of the remainder to tank 1. When the desired level of the size 27 in size box 2 is reached valve 6 is opened to allow pump 8 to withdraw size simultaneously from tank 1 as described previously, and from size box 2 through drain 4, valve 6 and T 34. In the pipe line connecting drain 4 and valve 6 is inserted a temperature sensitive control 20 which operates valve 21 mechanically, pneumatically or electrically to maintain automatically a constant temperature of the size 27 in size box 2. This latter feature is not necessary to the invention, but is included solely as a convenience and to increase operating efficiency.

Figure 4:
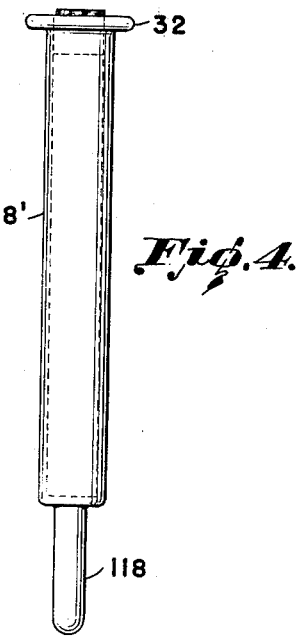
Figure 5:
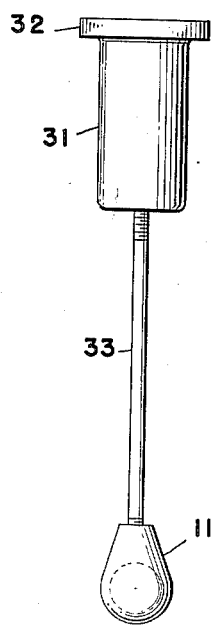
Figure 5 is a constant-weight variable-length level control float valve.

The liquid level in size box 2 may be kept constant by the proper setting of valves 6 and 15, but such settings are extremely difficult to realize practically. To make level control automatic a float valve 18 is employed. Said valve may take various forms, as shown in Figures 3, 4, and 5. All of the forms serve the same purpose, viz., to change the resistance to fluid entry into drain 4 in such manner and to such extent as to create a balance between the size fed in by jet 17 and that removed by the material impregnated and also by the pump through drain 4.

The valve in Figure 3 is the preferred embodiment. It consists of a cylindrical tube 18 of diameter greater than the inside diameter of drain 4. The tube is sealed and squared at one end and has a flanged rim 32 at the other. In use, valve 18 with flanged end uppermost, is restricted by guides 19, 19 to movement vertically directly over drain 4. As the size level drops the squared end moves closer to the drain hole thereby reducing the area for free entry of size into the drain. This allows the tank to fill up since the input of size through jet 17 remains unchanged. A rise in level causes the valve to operate in reverse manner increasing the area for entry of size into drain 4 making the rate of size removal greater than the input rate.

Upper guide 19 is set sufficiently high in tank 2 to limit downward movement of valve 18 to just short of complete closure of the drain hole. This limit is reached when flange 32 on its upper end comes in contact with and rests upon said guide. Said restriction of valve movement is necessary to prevent sticking due to suction which would be created in drain 4 upon complete closure of the drain hole.

The depth of size 27 in box 2 is changed on changing the weight of valve 18 by the addition of weights or shot placed within the float. A cork stopper 28, Figure 1, is provided.

The valve in Figure 3 controls size level by changing the effective cross section of the fluid stream entering drain 4. The valve in Figure 4, on the other hand, controls fluid flow by changing the resistance to flow. In this valve the lower end 118 of the tube 18' is of smaller diameter than the inside diameter of drain pipe 4 and rides therein. Thus the cross section of the fluid stream is constant but the length of path of reduced area and consequently resistance to flow, changes with fluctuations in fluid level. The desired depth of size is determined as before by the total weight of said valve.

Figure 6:
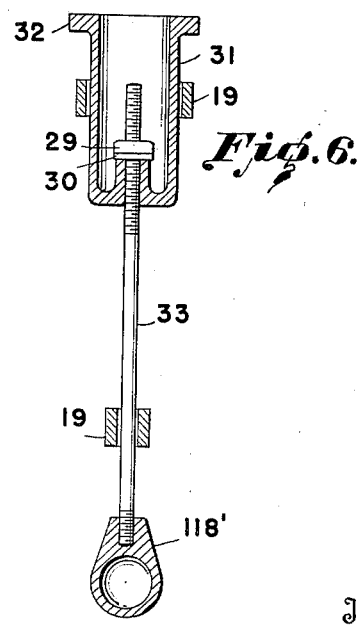
Figure 6 is a vertical cross-section of the valve pictured in Figure 5.

Both valves described above determine the depth of size in box 2 by virtue of their weight, which is changed to meet the desired needs. A different type of valve is that shown in Figure 5. This valve is of constant weight. The depth of the size is adjusted by changing its length. A sectional view in Figure 6 shows valve cup 31 attached to the lower end of a rod 33 which is threaded at its upper end. Rod 33 threads into the lower end of float 31. A jam nut 29 and gasket 30 lock the adjustment of valve length and seal the float against entry of size. The tear-drop shape of part 118' is preferred, but any such shape which minimizes the downward drag of fluid entering the drain would work equally well.

In the foregoing description use was made of only one unit of each component in the combination. It is obvious that the combination may include two or more storage tanks feeding one or more pumps which, in turn, supply sizing material to a plurality of size boxes.

This invention may be applied to fields other than the preparation and distribution of sizing materials and the like. The method and apparatus are applicable to the preparation and distribution of fluid mixtures and semi-fluids which can be pumped through pipes. Furthermore, where heating is not essential to the process, the heat exchanger unit need not be included in the combination. The heat exchanger unit may be used for cooling by circulating a coolant rather than steam around the coils 10, in Figure 1. Examples of other uses include: the preparation and distribution of foamed concrete mixtures in the building industry, the preparation and distribution of abrasive mixtures in grinding and lapping operations, and the preparation and distribution of paints, and food products.

Having thus described my invention, I claim:

1. An apparatus system for preparing and distributing sizing comprising a tank, a heat exchanger external to said tank, a size box, and a liquid pump; the tank having a lower outlet for size and a submerged blast liquid injector having a nozzle adjacent the bottom of the tank; the heat exchanger having an inlet and outlet for liquid to be heated; the size box having a submerged blast liquid injector having a nozzle adjacent its lower end, and having a liquid drain at its lower end; a valved conduit connecting the intake of the pump with the size outlet at the lower end of the tank, a second valved conduit connecting the intake of the pump with the size outlet at the lower end of the size box, a third conduit connecting the outlet of the pump with the heat exchanger, a fourth valved conduit connecting the outlet of the heat exchanger with the inlet of the liquid injector of the tank, a fifth valved conduit connecting the outlet of the heat exchanger with the inlet of the liquid injector of the size tank, and float means in the size box to control the volume of flow of size through the size outlet to maintain a constant liquid level in the size box.

2. A process of preparing sizing comprising maintaining a body of water in constant agitation by withdrawing a lower portion of the body of water and re-introducing said portion below the surface of the water under pressure, adding starch or other sizing material to the agitated water, continuing to withdraw a lower portion of the mixture and re-introducing it as aforesaid into the body of water, heating withdrawn mixture recirculating to the body of water, passing heated withdrawn mixture to a storage chamber, continuously withdrawing mixture from the lower part of the storage chamber, to prevent stagnation, and recirculating mixture so withdrawn, after heating, to the storage chamber.

3. An apparatus for preparing size comprising: a size tank, the tank having a non-tangential liquid injecting nozzle adjacent its lower end directed downwardly toward the bottom and side of the tank and at an angle to the vertical axis of the tank; and a liquid pump; and a heat exchanger external to the tank and having a valved outlet connected to the nozzle; conduit means connecting the outlet of the pump to the inlet of the heat exchanger; conduit means connecting the inlet of the pump to the outlet for size at the lower end of the tank; the nozzle outlet being submerged in liquid in the tank; the pump being of sufficient capacity to cause, in conjunction with the recited nozzle direction, top-to-bottom turnover of the tank contents; and a storage box for size, a valved liquid inlet pipe for said storage box, the inlet pipe being communicatively connected with the outlet of the heat exchanger; an outlet for size in the lower part of the storage box; a float valve for controlling the liquid level in said box, the float valve having an element which moves toward and away from the size outlet in the box as the size level fluctuates, this positioning of the element controlling the effective diameter of the size outlet to control the rate of outflow of size through said outlet; and a valved conduit connecting the size outlet of the storage box to the inlet of the pump.

GEORGE J. KYAME.

REFERENCES CITED

The following references are of record in the file of this patent:

UNITED STATES PATENTS

| Number | Name | Date |
|---|---|---|
| 1,411,934 | Rankin | Apr. 4, 1922 |
| 1,418,320 | Miller | June 6, 1922 |
| 1,706,418 | Sissom | Mar. 26, 1929 |
| 1,945,822 | Nivling | Feb. 6, 1934 |
| 1,991,148 | Gephart | Feb. 12, 1935 |
| 2,031,018 | Thomas | Feb. 18, 1936 |
| 2,103,549 | O'Neil | Dec. 28, 1937 |
| 2,325,573 | Thompson | July 27, 1943 |
| 2,432,175 | Schmidt | Dec. 9, 1947 |

FOREIGN PATENTS

| Number | Country | Date |
|---|---|---|
| 579,775 | France | Aug. 12, 1924 |
| 135,590 | Great Britain | Nov. 27, 1919 |
| 19,271 | Australia | Apr. 4, 1929 |